(12) United States Patent
Blakesley

(10) Patent No.: US 6,396,180 B1
(45) Date of Patent: May 28, 2002

(54) CONTROL DEVICE USING MAGNETIC FORCE TO CREATE FORCE VECTOR TO CONTROL AN OBJECT

(76) Inventor: Clarence S. Blakesley, 1141 E. Brian Rd., Pahrump, NV (US) 89048

( * ) Notice: Subject to any disclaimer, the term of this patent is extended or adjusted under 35 U.S.C. 154(b) by 0 days.

(21) Appl. No.: 09/875,193

(22) Filed: Jun. 7, 2001

(51) Int. Cl.$^7$ .............................................. H02K 21/12
(52) U.S. Cl. ................... 310/156.08; 310/46; 310/103; 310/112
(58) Field of Search ................. 310/156.08, 156.12, 310/156.13, 156.28, 156.29, 156.53, 46, 36, 103, 112, 108, 162

(56) References Cited

U.S. PATENT DOCUMENTS

| | | | | |
|---|---|---|---|---|
| 3,790,833 A | * | 2/1974 | Hasebe | 310/162 |
| RE29,165 E | * | 3/1977 | Bode | 310/46 |
| 4,169,983 A | * | 10/1979 | Felder | 310/46 |
| 4,751,486 A | * | 6/1988 | Minato | 335/272 |
| 4,877,983 A | * | 10/1989 | Johnson | 310/12 |
| 5,289,071 A | * | 2/1994 | Taghezout | 310/254 |
| 5,569,967 A | * | 10/1996 | Rode | 310/103 |
| 6,084,322 A | * | 7/2000 | Rounds | 310/46 |

* cited by examiner

Primary Examiner—Nestor Ramirez
Assistant Examiner—Thanh Lam

(57) ABSTRACT

A control device for an object includes a first wheel and a second wheel that rotate in opposite directions on a shaft affixed to a frame. The first and second wheels have openings to accept magnets that are free to slide up and down in the openings. As the wheels rotate, the magnets are urged outwards due to centrifugal force. The wheels have titanium sleeves fitted around the outer surfaces of the wheels, which have openings smaller in size than the openings of the wheels, so as to maintain the magnets within the openings even as the wheels rotate. Solenoid stations are provided around the wheels, and as a result of magnetic pulses provided from at least one of the solenoid stations, in synchronism with rotation of the wheels, a magnet is urged inwards to a center of the wheel in which it is disposed, to thereby result in a force vector that causes movement of the frame to thereby control the object.

6 Claims, 8 Drawing Sheets

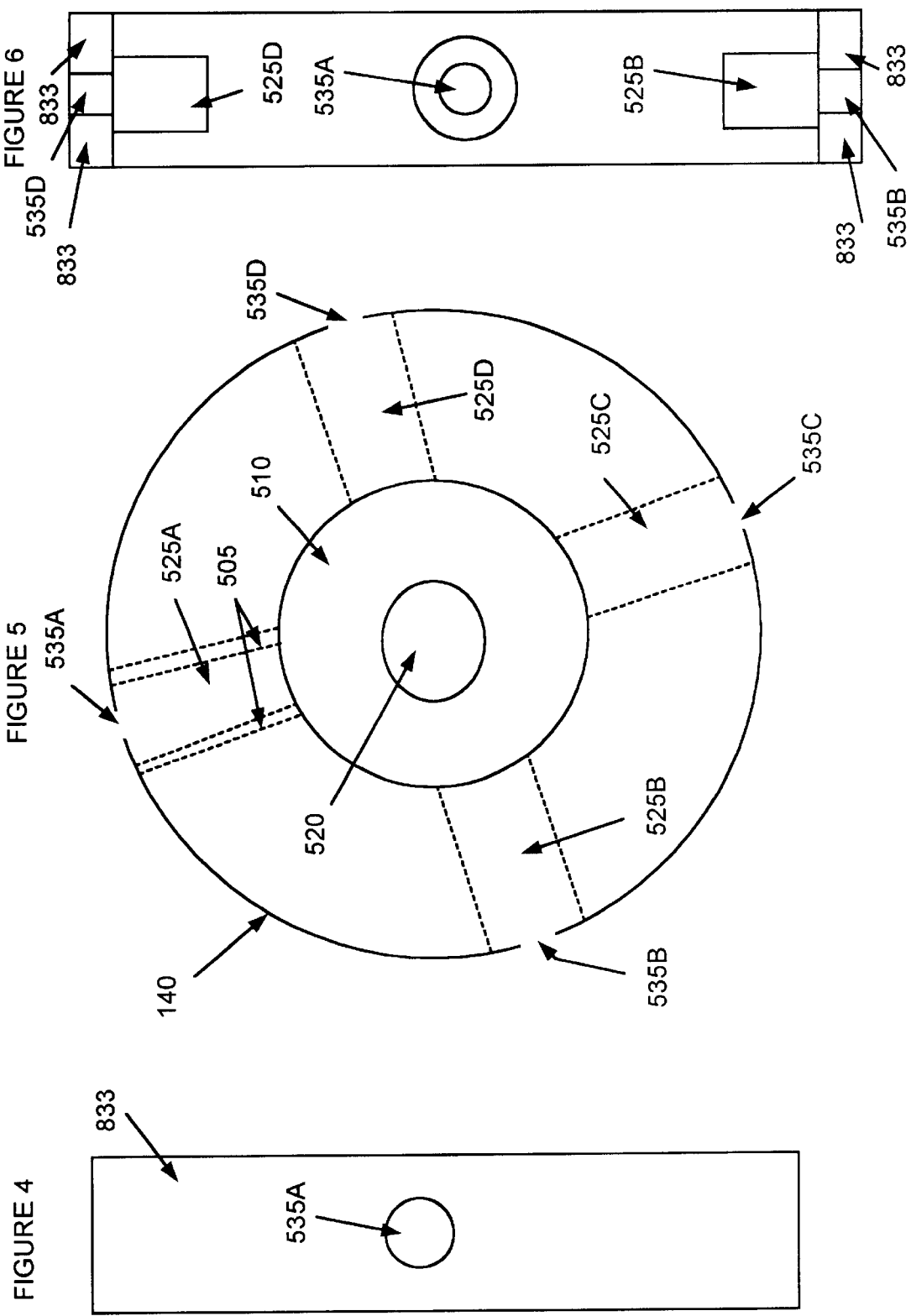

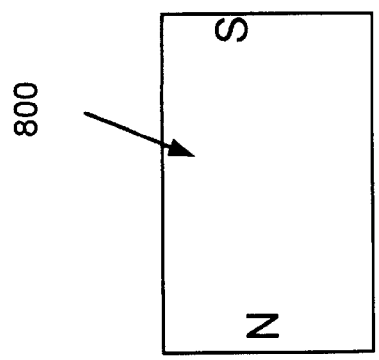
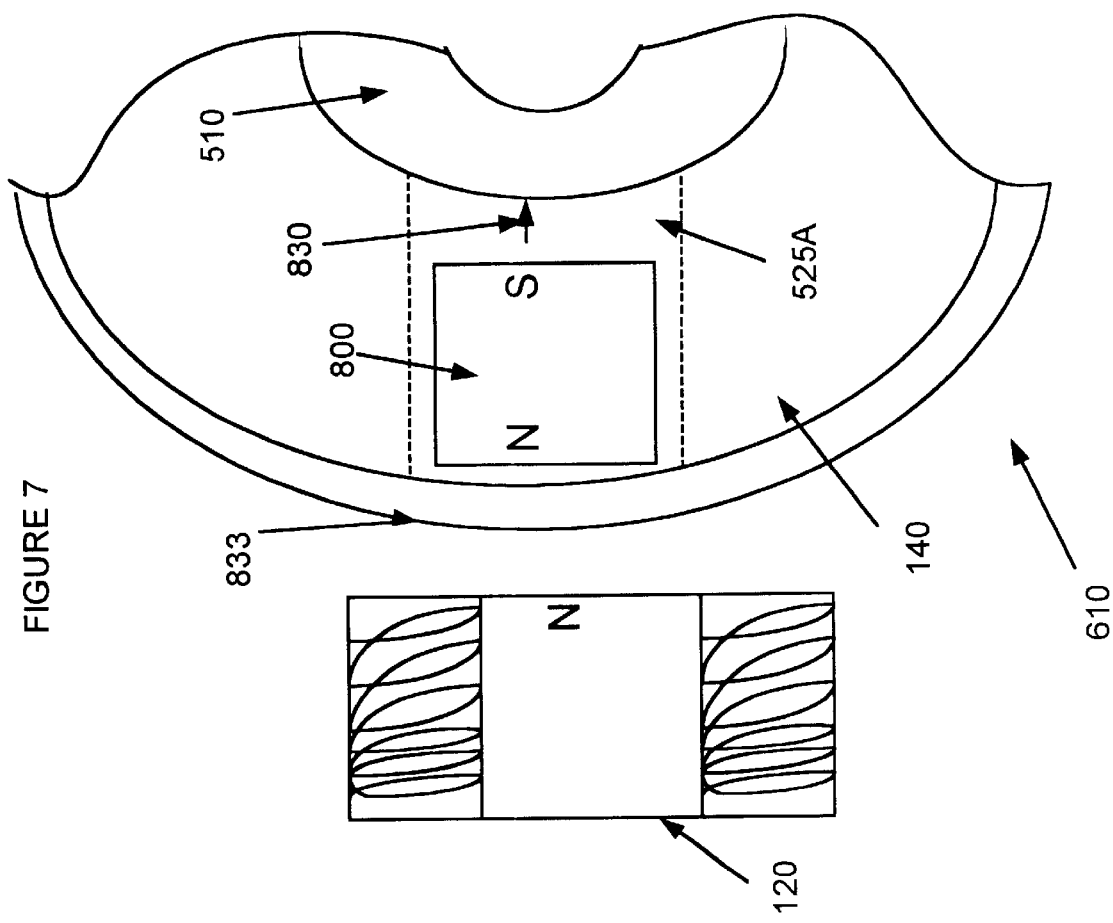

CONTROL DEVICE USING MAGNETIC FORCE TO CREATE FORCE VECTOR TO CONTROL AN OBJECT

BACKGROUND OF THE INVENTION

A. Field of the Invention

The invention relates generally to a control device for controlling and/or for providing propulsion for various devices, such as for controlling an orbit of a satellite in space or for controlling a steering of a vehicle or for providing propulsion for the vehicle.

B. Description of the Related Art

Conventional control devices, such as gyroscopes or steering mechanisms, require precise control to perform their functions. Also, conventional propulsion devices are complex and fairly costly.

There is a need to provide a control device that is fairly simple to construct and operate.

There is also a need to provide a propulsion device that is fairly simple to construct and operate.

SUMMARY OF THE INVENTION

The present invention is directed to a control device, which includes a motor that provides power. The motor is coupled to a first wheel and a second wheel by a pinion/gear arrangement, whereby the first wheel is made to rotate in a first direction (e.g., clockwise) while the second wheel is made to rotate in a second direction (e.g., counterclockwise). The first and second wheels are coupled to the motor via first and second ring gears. The first and second wheels and first and second ring gears are coupled to a shaft, which does not rotate. As the wheels rotate in opposite directions, magnetic pulses are provided from at least one location, so as to provide a magnetic force to the wheels at the same time. Each of the wheels has magnets that are fitted into various locations within the wheels, whereby the magnets are capable of sliding up and down within those locations. As the wheels spin, the magnets are urged outwards due to centrifugal force. The magnetic pulses provided at precise instants in time provide a same-polarity force to the magnets, forcing them inwards to somewhat counteract the centrifugal force due to the spinning of the wheels. This creates an imbalance in the wheels, whereby that imbalance can be used to provide control, such as for repositioning a satellite that has drifted from its proper orbit.

The present invention is also directed to a propulsion device having elements as described above.

BRIEF DESCRIPTION OF THE DRAWINGS

The foregoing advantages and features of the invention will become apparent upon reference to the following detailed description and the accompanying drawings, of which:

FIG. 4 is a front on view of a titanium sleeve fitted onto a wheel, according to the first embodiment of the invention;

FIG. 5 is a side view of one of the wheels according to the first embodiment of the invention;

FIG. 6 is a front on view of a wheel without the titanium sleeve fitted thereon, according to the first embodiment of the invention;

FIG. 7 is a diagram showing the magnetic repelling force provided by way of a pulsing station, according to the first embodiment of the invention;

FIG. 8 is a diagram showing a ceramic magnet that may be utilized in a device according to the first embodiment of the invention;

DETAILED DESCRIPTION OF SPECIFIC EMBODIMENTS

The present invention will be described in detail below, with reference to the accompanying figures.

Figure 1:
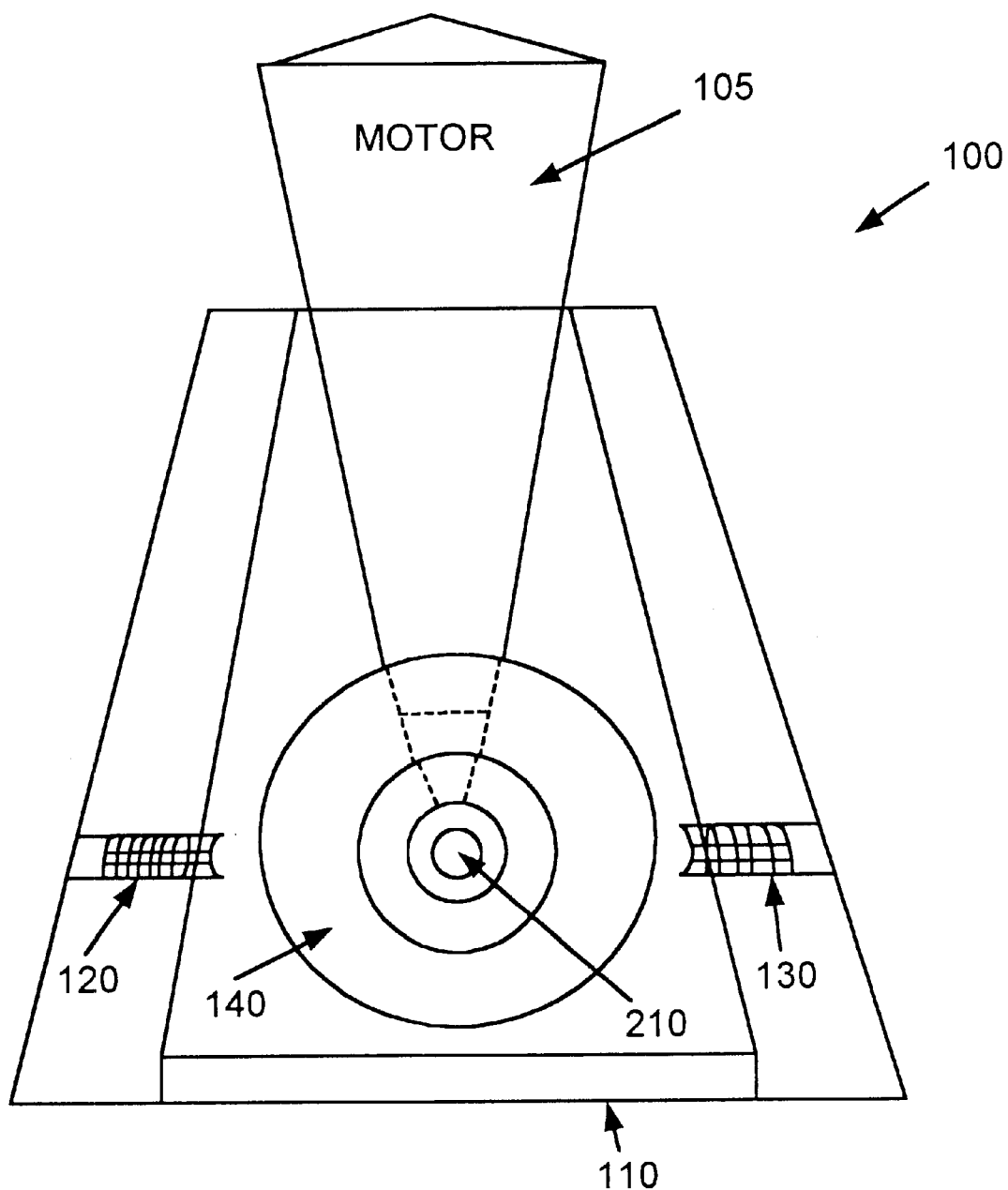
FIG. 1 is a front view of a control device according to a first embodiment of the invention.

FIG. 1 shows a front view of a control device 100 for controlling an object, according to the invention. The device may also be utilized for propulsion or movement of an object from one location to another location. In FIG. 1, there is provided a motor 105, which is preferably an electric motor that may be powered by a generator, for example. The motor 105 is controlled by a computer, not shown. Such a computer may be a conventional personal computer, such as one powered by an Intel Pentium™ IV chip or an AMK7™ chip, for example. The motor 105 may alternatively be powered by batteries, or by AC.

The motor 105 is mounted onto a frame 110, which is made of aluminum alloy in the first embodiment, but which may be made out of any suitable material for holding the various elements making up the control device 100.

Also shown in FIG. 1 is a first pulsing (or solenoid) station 120 and a second pulsing (or solenoid) station 130, which provide magnetic pulses at precise instants in time, under control of the computer. The two pulsing stations 120, 130 are positioned 180 degrees apart from each other on a top surface of a bottom plate of the frame 110. The frame 110 also includes two vertical portions 110A, 110B, which extend upwards from the top surface of the bottom plate 110C of the frame 110 (see FIG. 2).

A first wheel 140 is shown in FIG. 1, whereby a second wheel (150, see FIG. 2) is hidden from view in FIG. 1, since it is disposed directly behind the first wheel 140 (with respect to the front view of FIG. 1). The two wheels 140, 150 rotate about a shaft 210.

Figure 2:
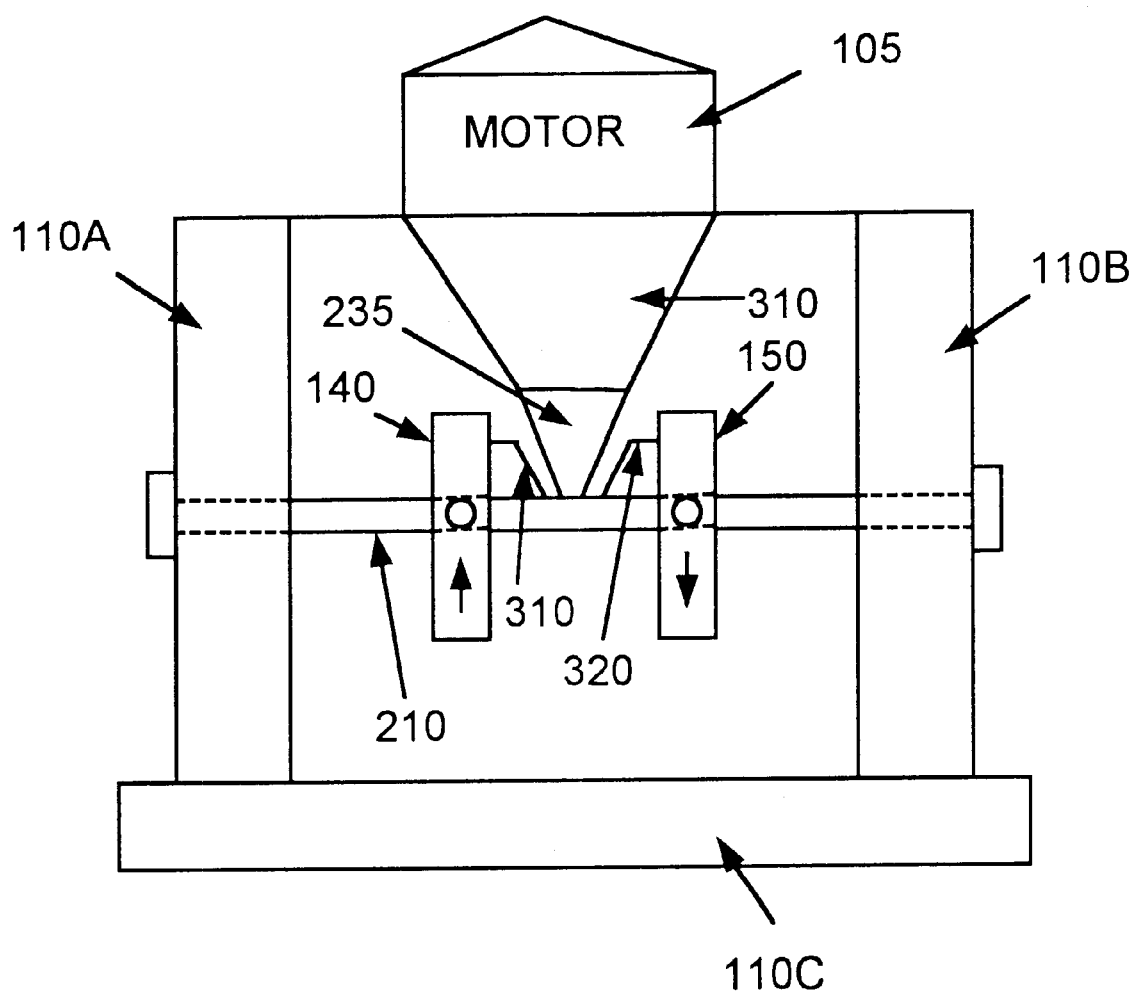
FIG. 2 is a side view of the control device (as viewed from a pulsing station) according to the first embodiment of the invention.

FIG. 2 shows a side view of the control device 100 according to a first embodiment of the invention, whereby the shaft 210 is shown mounted to the frame 110. The two wheels 140, 150 can be seen in FIG. 2, whereby one wheel is caused to rotate in a first direction, e.g., clockwise, while the other wheel is caused to rotate in a second direction, e.g., counterclockwise. The two wheels 140, 150 rotate at the same speed, e.g., 1000 revolutions per minute (rpm), or fixed a value between 500 rpm and 10,000 rpm.

Figure 3:
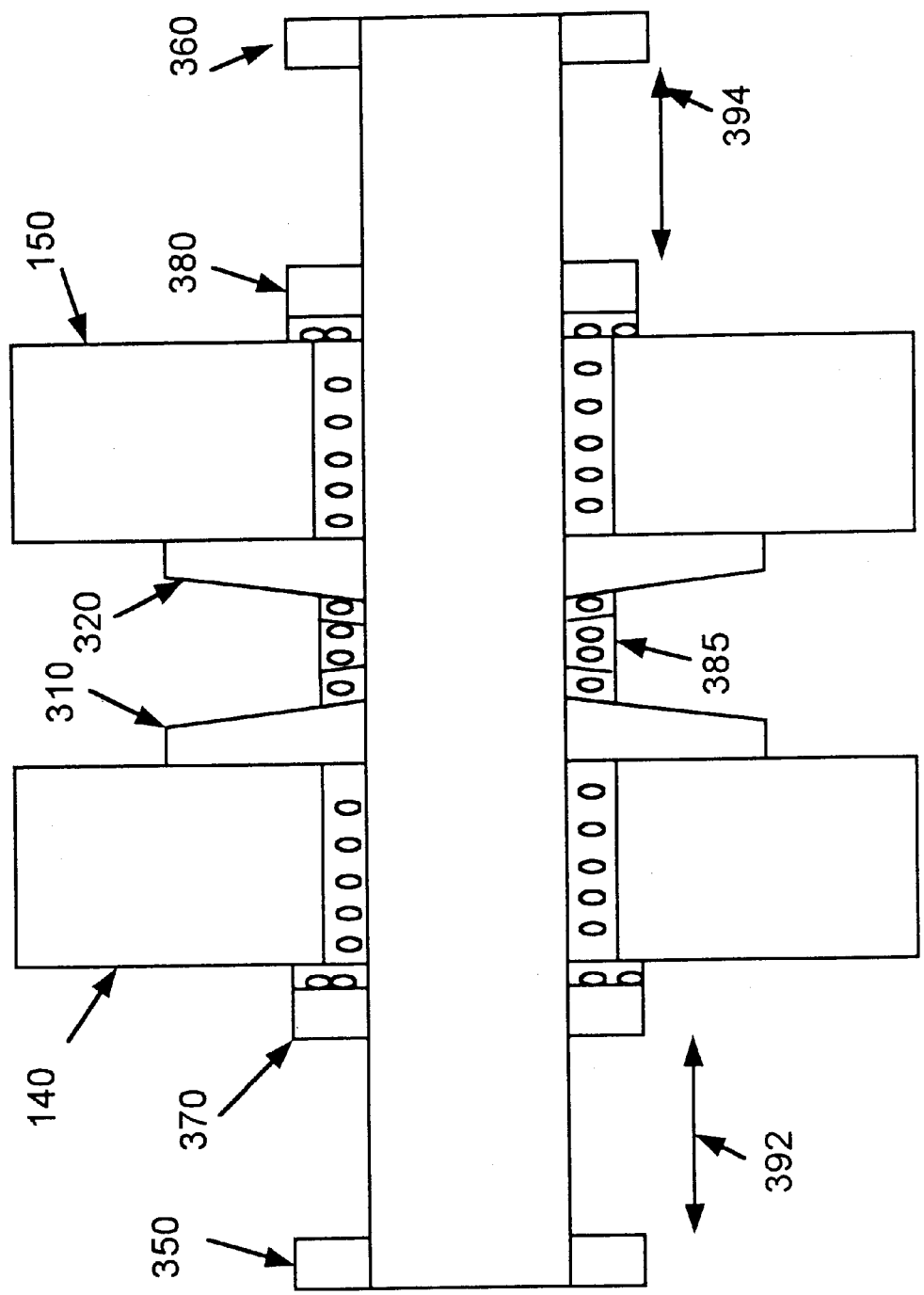
FIG. 3 is a view of the elements coupled to the shaft of the control device according to the first embodiment of the invention.

The wheels 140, 150 rotate due to power supplied by way of the motor 105. The motor 105 is coupled to the two wheels 140, 150 by a pinion and gear assembly 235, as seen in FIG. 2. FIG. 3 shows the various elements coupled to the shaft 210. The first wheel 140 is coupled to a pinion (part of the pinion and gear assembly 235) by way of a first ring gear 310, which causes the first wheel 140 to rotate in a first direction (due to the rotational force imparted on the first ring gear 310 by the pinion). The second wheel 150 is coupled to the pinion by way of a second ring gear 320, which causes the second wheel 150 to rotate in a second direction opposite the first direction. Alternatively, hypoid gears or face gears may be utilized instead of ring gears, for translating the power from the motor 105 to cause rotation of the first and second wheels 140, 150. The pinion and the gears 310, 320 should preferably have about 4 to 6 thousandths of an inch play, to provide a good fit between these elements.

The shaft 210 is coupled to the frame 110 by way of nuts 350, 360, as seen best in FIGS. 2 and 3. The nuts 350, 360 rigidly couple the shaft 210 to the frame 110, whereby the wheels 140, 150 rotate on the shaft 210 and cause little if any vibration as they rotate. To accomplish this, the wheels 140, 150 are symmetrical in shape (center of gravity at the center of the wheels 140, 150), thereby providing a balanced set of wheels 140, 150 that rotate on the shaft 210.

Also shown in FIG. 3 are first and second spacers 370, 380, which are provided on the shaft 210 and which are coupled to outer surfaces of the two wheels 140, 150. A third spacer 385 is also provided between the two ring 310, 320, at a location where the pinion couples (by way of a tooth-to-tooth engagement) to the ring gears 310, 320. FIG. 3 also shows mount gaps 392, 394 which are regions on the shaft 210 where the vertical portions 110A 110B of the frame 110 are disposed when the shaft 210 is fitted onto the frame 210, as seen best in FIG. 2. In the present invention, a hole is provided on each of the vertical portions 11A, 110B of the frame 110, which is sized to accept the shaft 210 when the shaft 210 is fitted therein. The shaft 210 is fitted through the holes on the two vertical portions 110A, 110B of the frame 110 and is secured to the frame 110 by way of the nuts 350, 360.

In the present invention, each of the elements that rotate on the shaft 210 have bearings, which allow those elements to turn or rotate relative to the shaft 210 on which they are disposed. Preferably, the bearings are made out of a very hard material, such as by utilizing a TACO process to make the bearing of sufficient hardness. Other processes for forming bearings made of hard material in the present invention may be utilized, as are known to those skilled in the art.

The shaft 210 is preferably made out of steel, to provide strong support for the control device 100 according to the present invention. Other hard metal compositions may alternatively be utilized for forming the shaft 210.

An important feature of the invention is the structure of the wheels 140, 150. FIGS. 4, 5 and 6 show various views of the wheels 140, 150, which make up part of the wheel/sleeve configuration 610. The wheel/sleeve configuration 610 is included in the control device 100 according to the invention so as to provide control of an object, such as control of a satellite or control of an airplane or a vehicle (e.g., steering control). Alternatively or additionally, the control device 100 may be operable as a propulsion device for providing movement of an object. The wheels 140, 150 are preferably made out of an aluminum alloy.

Referring now to FIG. 5, one wheel 140 of the control device 100 is shown, whereby the other wheel 150 of the control device 100 has a similar construction. The wheel 140 has a ring gear portion 510 (with not shown teeth that engage teeth on the pinion), which allows the wheel 140 to rotate on the shaft 210. A hole 520 is provided in the middle of the wheel 140 (giving it a somewhat donut shape), which is a region by which the wheel 140 is fitted onto the shaft 210.

Each wheel 140, 150 is preferably made out of aluminum alloy. Alternatively, the wheels 140, 150 may be made out of a hard plastic composition. The size of the wheels 140, 150 may vary, whereby the size of the wheels 140, 150 is determined based on the intended use of the control device 100 and the amount of force required by the control device 100 in order to control or to propel an object (which is coupled to the control device 100 so that the control force is translated to the object so as to control the object). For example, a wheel of a size of from 1 inch up to 12 inches or more may be contemplated for providing attitude control of a satellite. In the first embodiment, each wheel 140, 150 has four cylindrical regions 525A, 525B, 525C, 525D provided at 90 degree offset locations, as seen best in FIG. 5. These regions 525A, 525B, 525C, 525D are locations where four cylindrically-shaped magnets are respectively disposed.

FIG. 8 shows a magnet 800 that is sized so that it can be slidably disposed within one of the regions 525A, 525B, 525C, 525D of the wheels 140, 150. Preferably, the fit is such that there is some amount of play from allowing the magnets 800 to slide up and down within the regions 525A, 525B, 525C, 525D with little if any friction being imparted on the magnets 800 to hamper their movement. Since two wheels 140, 150 are utilized in the first embodiment of the present invention, eight magnets are used—four per wheel. Preferably, the magnets 800 are ceramic magnets, but other types of magnets that are made of a hard material may be utilized while remaining within the scope of the invention as described herein. A hard material magnet is preferably utilized so that it will not wear down due to its sliding up and down within the regions 525A, 525B, 525C, 525D. This allows for a long-lasting control device 100.

The magnets 800 are free to slide up and down within the regions 525A, 525B, 525C, 525D, similar to how a piston moves up and down in a cylinder of an internal combustion engine. The regions 525A, 525B, 525C, 525D extend all the way to the outer peripheral surface of the wheels 140, 150. FIG. 6 shows three of the holes 535A, 535B, 535D (one hole 535C is not shown since it is blocked from view), which are provided on sleeves 833 (to be described in more detail below). The holes 535A, 535B, 535C, 535D are sized to be smaller in diameter (e.g., 5% to 50% smaller) than the diameter of the regions 525A, 525B, 525C, 525D and thus smaller than the size of the magnets 800 that are disposed within the regions 525A, 525B, 525C, 525D.

The regions 525A, 525B, 525C, 525D also preferably have titanium or brass sidewalls, which allow the magnets 800 to readily slide up and down within the regions 525A, 525B, 525C, 525D, while not providing any magnetic field. The sidewalls are preferably from 5 to 100 thousandths of an inch in thickness. FIG. 5 shows sidewalls 505 for regions 525A, whereby the other regions 525B, 525C, 525D also preferably have titanium or brass sidewalls.

Once the magnets 800 are inserted into the regions 525A, 525B, 525C, 525D of the wheels 140, 150, a sleeve 833 is then fitted onto the outer surface of each of the wheels 140, 150, whereby two sleeves 833 as required (one for each wheel). Each sleeve 833 is made out of a hard metal composition, such as titanium, brass or graphite (similar to the composition of the sidewalls 505). The sleeve 833 is formed as a circular band, with a narrow thickness (e.g., ¼ to ½ inch thickness).

The sleeve 833 has four holes 535A, 535B, 535C, 535D provided 90 degrees apart from each other, so as to be co-located with the cylindrical regions 525A, 525B, 525C, 525D of the wheels 140, 150. FIG. 4 shows a side view of the sleeve 833, and FIG. 6 shows a side view of the sleeve 833 fitted onto the wheel 140. Since the holes 535A, 535B, 535C, 535D of the sleeve 833 are sized to be smaller than the diameter of the magnets 800, the magnets 800 are prevented from exiting from their respective cylindrical regions 525A, 525B, 525C, 525D in which they are disposed when the wheels 140, 150 rotate. The centrifugal force caused by wheel spinning results in a force vector that urges the magnets 140, 150 outwards to thereby want to exit out of the regions 525A, 525B, 525C, 525D of the wheels 140, 150.

The titanium or brass sidewalls 505 disposed on the regions 525A, 525B, 525C, 525D of the wheels 140, 1500 are preferably micro-finished, to allow the magnets 800 to move up and down within those regions 525A, 525B, 525C, 525D with little if any friction counteracting that movement. With the magnets 800 in place within the regions 525A, 525B, 525C, 525D, the sleeves 833 are fitted around the wheels 140, 150, preferably by a press fitting process. Two sleeves are required—one per wheel.

The band-shaped sleeves 833 are sized to be slightly larger in size than the diameter of the wheels 140, 150 (e.g., 1 to 5 thousandths of an inch larger). When the sleeves 833 are fitted around the wheels 140, 150, they are then subjected to heat (e.g., 800 to 1000 degrees C.), and then allowed to cool (to room temperature for 1 to 4 hours), to thereby obtain a press fit of the sleeve 833 around each wheel 140, 150. That way, the sleeves 833 are firmly fitted in place around the wheels 140, 150, whereby they are placed such that the four holes 535A, 535B, 535C, 535D of the sleeves 833 and the cylindrical regions 525A, 525B, 525C, 525D of the wheels 140, 150 are aligned (see FIG. 5, for example, showing such an alignment).

In the present invention, one wheel 140 rotates clockwise and one wheel 150 rotates counterclockwise. The wheels 140, 150 rotate in synchronism at the same frequency and in-phase, thereby forming a stable control device 100. The oppositely rotating wheels 140, 150 provides for a stable control device 100, while also allowing for the control device 100 to precisely control an object such as a satellite or a steering mechanism for a motor vehicle. The control device 100 can also be used to propel an object.

Referring back to FIGS. 1 and 2, the control device 100 of the present invention also includes two pulsing or solenoid stations 120, 130, which are disposed 180 degrees apart from each other on the bottom portion 110C of the frame 100 of the control device 100. The wheels 140, 150 are positioned between the pulsing stations 120, 130. Each pulsing station 120, 130 includes a coil (wire windings) and is capable of outputting pulses that have a magnetic field associated with them. The pulses are outputted at a controlled rate, based on control signals provided to the pulsing stations 120, 130 from the computer. The computer also controls the rpm of the motor that is providing the power to cause the wheels 140, 150 to rotate at a precise rate.

As the wheels 140, 150 rotate, the respective magnets 800 within the wheels 140, 150 are urged outwards to the outermost ends of their cylindrical openings 525A, 525B, 525C, 525D due to the centrifugal force caused by the rotation of the wheels 140, 150. This causes the magnets 800 to impact an inner surface of the sleeves 833 fitted around the wheels, 140, 150. However, since the sleeves 833 are press fitted onto the wheels 140, 150, and since the holes 535A, 535B, 535C, 535D are smaller than the size of the magnets 800, the magnets are maintained within the regions 525A, 525B, 525C, 525D.

When the wheels 140, 150 are rotating and with no pulses being output by the pulsing stations 120, 130, an equilibrium state is achieved, whereby each of the magnets 800 (and their corresponding masses in each wheel 140, 150) move outwards, but in a symmetrical manner (since there are four magnets 800 spaced 90 degrees apart within each of the wheels 140, 150).

In order to provide control of an object, pulses are provided (under control of the computer) to one of the pulsing stations 120, 130, in order to create a desired force vector. For example, magnetic pulses may be provided at the left side station 120 shown in FIG. 1, whereby those pulses are of a particular polarity (e.g., that create a N-polarized magnetic field at the pulsing station 120) This results in a force vector urging the magnet 800 facing the solenoid station 120 to move away from the solenoid station 120, since the surface of the magnet 800 facing the solenoid station 120 is of the same polarity as the pulse emitted by the solenoid station 120. The repelling force provided by the N—N magnetic fields is made so as to be slightly stronger than the centrifugal force that is acting to urge the magnets 800 outwards. The centrifugal force is proportional to the rotational rate of the wheels 140, 150, and the magnetic field strength output by the pulses of the pulsing station 120 is determined accordingly. One of ordinary skill in the art can readily determine the necessary magnetic field force needed to accomplish this.

Assume that the magnets 800 are inserted into the regions 525A, 525B, 525C, 525D of the wheels 140, 150 such that the North pole surface of each of the magnets 800 is facing outwards, and whereby the South pole surface of each of the magnets 800 is facing the shaft 210. Now, assume that the wheels 140, 150 are each rotating at a rate of 1000 rpm. In that case, pulses are applied to the left-side pulsing station 120 (with respect to the front view of FIG. 1) at a rate of 4000 rpm, in synchronism with the rotation of the wheels 140, 150. As a result, as each pulse is output from the left-side pulsing station 120, that pulse is output at the same time a magnet 800 passes across the left-side pulsing station 120 (e.g., the left-side pulsing station 120 directly faces one of the cylindrical regions 525A, 525B, 525C, 525D of the wheels 140, 150 as shown in FIG. 4 at the instant the pulse is output). Each pulse is output to create a magnetic field having the same polarity as the polarity of the surface of the magnet 800 facing the left-side pulsing station 120. This creates a repelling force between the pulsing station 120 and the magnet 800. Since the pulsing station 120 is fixed in position on the frame 110, and since the magnet 800 is not fixed but instead can slide within the cylindrical region 525A, the N—N repelling force causes the magnet 800 to move away from the pulsing station 120 and thereby move further in the cylindrical region 525A.

Alternatively, if the magnets 800 are disposed within the cylindrical regions 525A, 525B, 525C, 525D such that their surface facing the pulsing stations 120, 130 has South (S) polarity, the pulses emitted by the pulsing stations would create a S polarity magnetic field to achieve the desired repelling force.

As a result of the repelling force, the weight distribution of the wheels 140, 150 with respect to the shaft 210 is no longer symmetric, but is changed such that the weight distribution is more towards the right side of the wheels 140, 150 than to the left side of the wheels 140, 150. This occurs because one of the four magnets 800 on each of the wheels 140, 150 that faces the left-side solenoid 120 has been pushed inwards (towards the shaft 210), while the other three magnets 800 on each of the wheels 140, 150 are at the outermost portions of their respective regions 525A, 525B, 525C, 525D within the wheels 140, 150 (and thereby pushing against the sleeve 833) due to the centrifugal force caused by the rotation of the wheels 140, 150. FIG. 7 shows an arrow 830 which denotes the direction that the magnet 800 moves due to the N—N repelling force.

Figure 9:
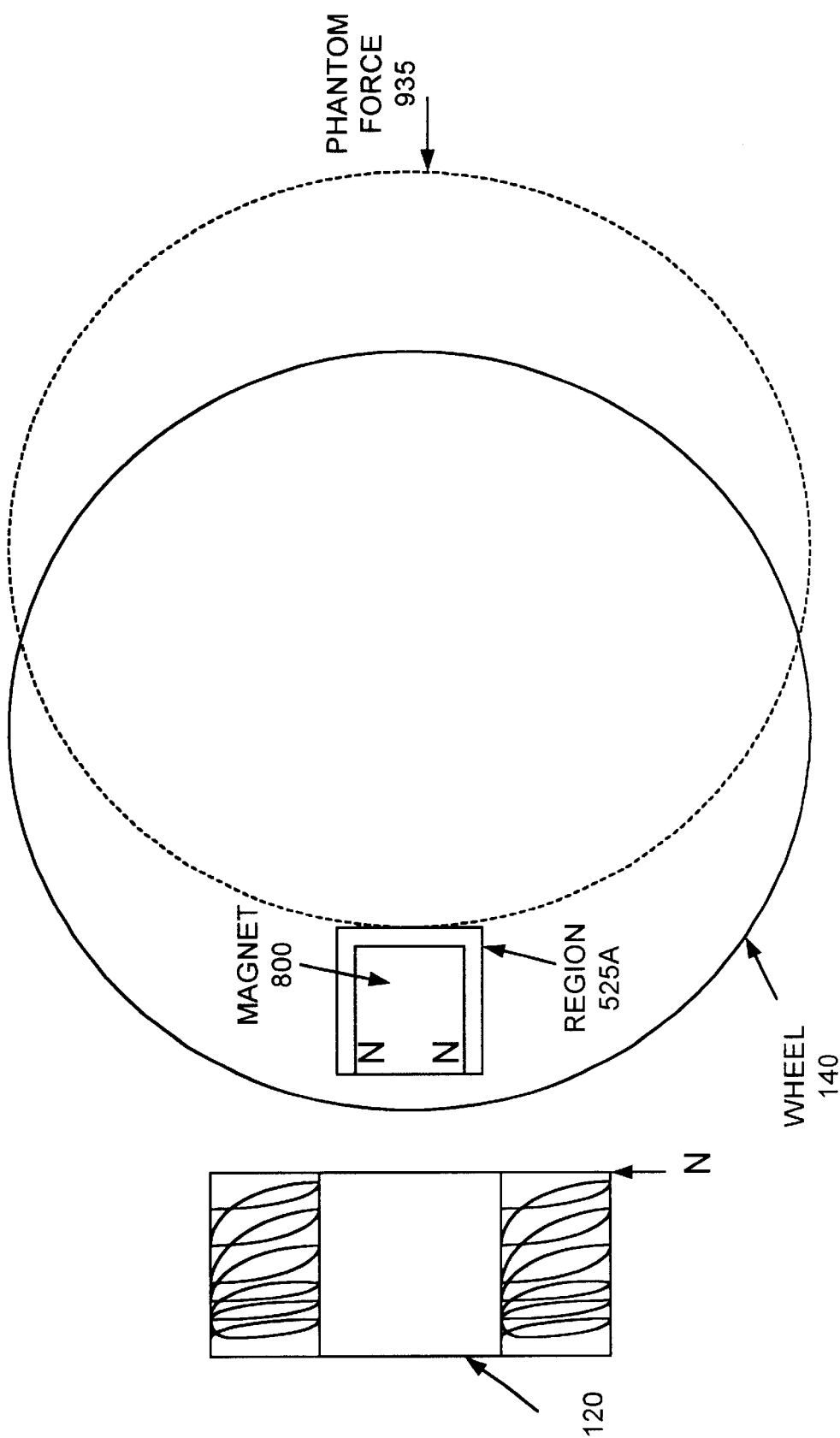
FIG. 9 is a diagram showing the force provided by the device according to the first embodiment of the invention.

FIG. 9 shows a phantom force rotation path 935 that is obtained due to the North-polarity pulse being incident on the North-polarity surface of the magnet 800, which pushes the magnet 800 away from the pulsing station 120. Since the wheels 140, 150 are rotating on the shaft 210 that is affixed to the frame 110, this force is translated to the frame 110 to thereby cause movement of the frame 110 (in a direction in which the magnet 800 is repelled), and thus to cause movement of an object coupled to the frame 110 by an amount shown by the difference between the wheel position 140 shown in FIG. 9 and the phantom force rotational path 935.

Since the wheel 140 rotates around the shaft 210, the shaft 210 is also urged in the same direction. Since the shaft 210 is fitted onto the frame 110 by way of the vertical portions 110A, 110B of the frame 110, the frame 110 is also urged in that same direction.

A weight distribution change occurs on each wheel 140, 150, by way of the pulsing station 120 providing pulses at precise instants in time to thereby affect the magnets 800 disposed in each wheel 140, 150. This causes the frame 110, which may be coupled to a gimbal of a satellite, for example, to move in a precise amount and in a precise direction in order to correct an orbit drift of a satellite that is orbiting the Earth. In the present invention, the magnets 800 have a mass and the pulsing stations 120, 130 emit a magnetic field of an amount to cause the magnets 800 to move a few tenths of an inch within the regions 525A, 525B, 525C, 525D. One of ordinary skill in the art would readily be able to determine the needed magnetic field strength to accomplish this amount of movement, based on the mass of the magnets 800 being moved and the rotational rate of the wheels 140, 150 (e.g., 500 to 1000 gauss magnetic field for 5 ounce magnets 800 that are disposed in wheels 140, 150 rotating at 1500 rpm).

In the example provided above, the computer controls both the rotation speed of the wheels 140, 150, as well as the pulsing rate and magnetic strength output by the pulsing stations 120, 130. Only one pulsing station 120, 130 at a time would output pulses, to cause control (or movement) of an object in one direction.

Due to the use of magnetic force caused by pulsing, there is no mass (e.g., no piston or other object) directly provided to the wheels 140, 150. In the present invention, by utilizing a magnetic repelling force, a force vector of a particular strength and direction is provided by way of the control device 100 of the present invention. This force vector can be used to control an object, or to propel an object.

Figure 10:
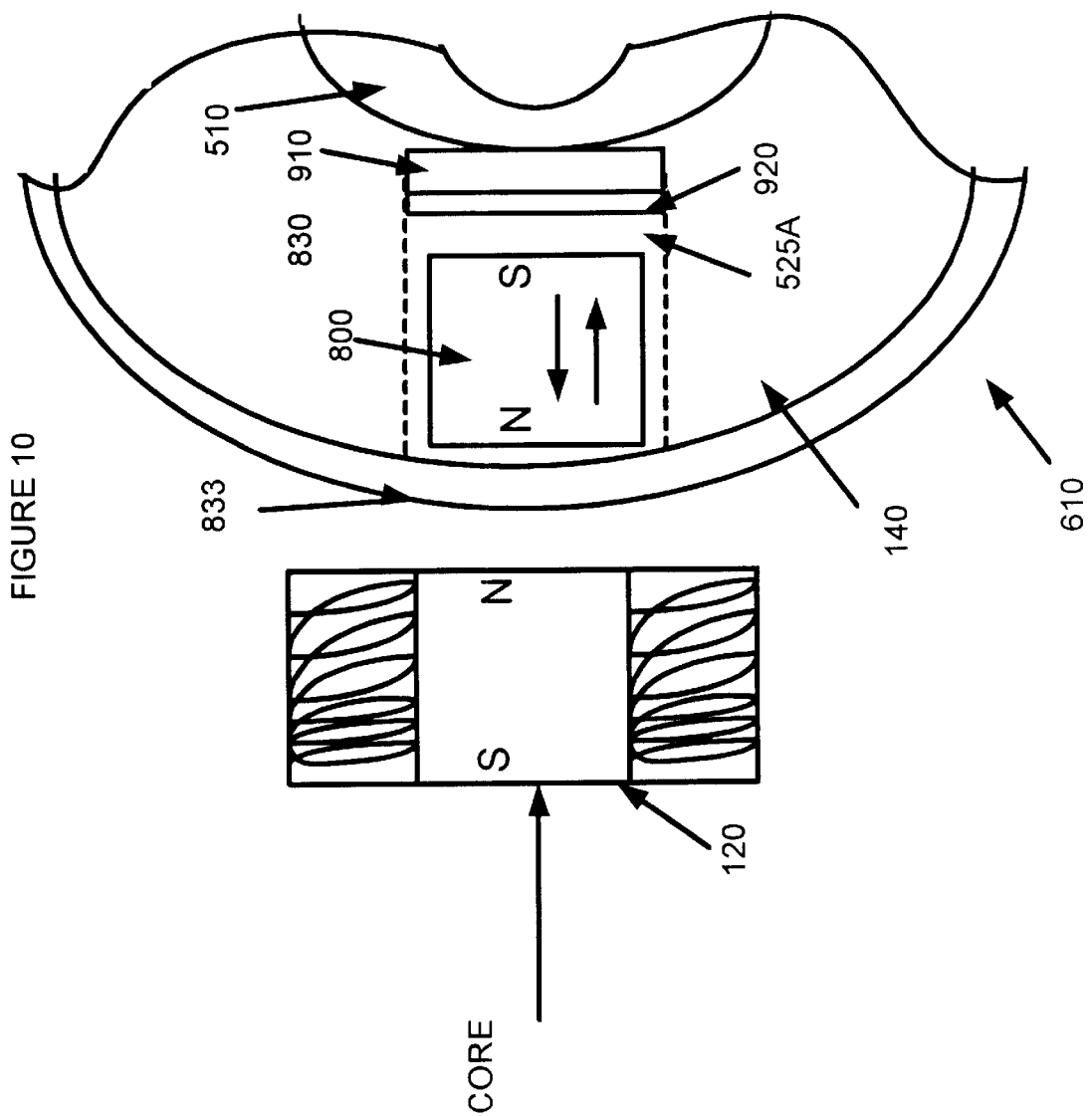
FIG. 10 is a side view of one of the wheels that is included in a control device according to a second embodiment of the invention.

FIG. 10 shows a second embodiment of the invention, in which another magnet 910 is disposed within each of the cylindrical regions 525A, 525B, 525C, 525D of the wheels 140, 150. Unlike the magnet 800, the magnet 910 does not move within the regions 525A, 525B, 525C, 525D, and can be any type of magnet (since wearing out of the magnet is not an issue due to the magnet 910 does not occur due to the magnet 910 being fixed in position within the bottom portions of the regions 525A, 525B, 525C, 525D of the wheels 140, 150).

The magnets 910 are fixed in position at one end of each of the regions 525A, 525B, 525C, 525D. The magnets 910 have an outer-facing surface with a polarity of opposite polarity to a nearest-facing surface of the magnet 800. This results in an attraction force that helps pull the magnets 800 towards the center of the wheels 140, 150, thereby providing better balance of the wheels 140, 150 as they rotate.

The magnets 910 are locked in place within the regions 525A, 525B, 525C, 525D by a lockdown element 920, which is preferably made of brass or titanium. The North-South facing adjacent surfaces of the magnets 800, 910 results in a force vector that urges the magnets 800 towards the magnets 910. As the wheels 140, 150 rotate, the centrifugal force causes the magnets 800 to want to move away from the magnets 910, and when the pulses from one of the solenoid stations 120, 130 are incident on the magnets 800, the repelling force that results pushes the magnets 800 back towards the magnets 910.

FIG. 10 also shows the sleeves 833 that are fitted around each of the wheels 140, 150, to prevent the magnets 800 from exiting the regions 525A, 525B, 525C, 525D. Also shown in FIG. 10 is a core of the solenoid station 120 that is used to create a magnetic field, which is imparted onto the pulses output by the solenoid station 120.

In an alternative configuration, the wheels 140, 150 rotate co-planar with the top surface of the bottom portion 110C of the frame 110 (as opposed to rotating along a plane perpendicular with respect to the bottom portion 110C of the frame 100), whereby four pulsing stations (or more) can be provided around the wheels 140, 150. This allows for control of an object along any radial x,y radial direction, and not just in a forward and backwards direction between the two pulsing stations 120, 130 as in the first embodiment described earlier.

In a third embodiment, the pulsing stations 120, 130 are turned on to emit a continuous magnetic field as soon as the control device 100 is activated. This results in an equilibrium state with respect to the wheels 140, 150, since the repelling forces caused by the pulsing stations 120, 130 being on at the same time counteract each other. That is, a magnet 800 on one side of the wheels 140, 150 is pushed inwards from pulsing station 120, while a magnet on the other side of the wheels 140, 150 is also pushed inwards from pulsing station 130.

To cause movement or control of an object in a particular direction in the third embodiment, one of the pulsing stations 120, 130 is turned off, which results in movement of the frame 110 in the direction of the pulsing station that has been turned off.

Furthermore, instead of turning off a pulsing station to achieve a desired force vector, a pulsing station may be moved away from the wheels 140, 150, such as by pivotably mounting the pulsing stations to the frame 100. With such a pivotable coupling, a pulsing station may be pivoted away from the wheels 140, 150, to thereby remove the repelling force on the wheels 140, 150 for that pulsing station, while maintaining the magnetic field of the pivoted pulsing station in an ON state.

Figure 11:
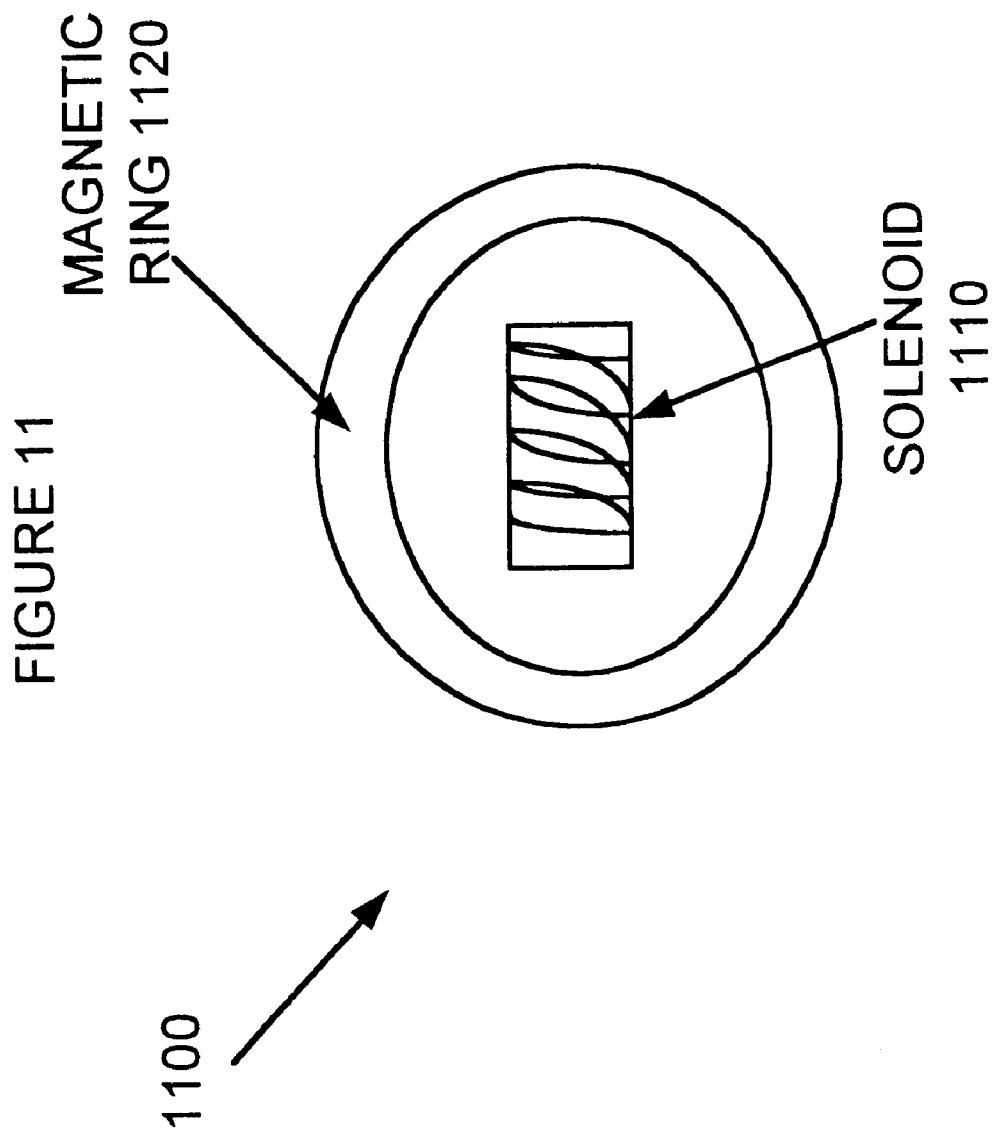
FIG. 11 is a front on view of a solenoid station according to a fourth embodiment of the invention.

FIG. 11 shows a solenoid station 1100 that is included in a control device (or propulsion device) according to a fourth embodiment of the invention. The solenoid station 1100 according to the fourth embodiment includes a magnetic ring 1120 that surrounds a solenoid 1110. The solenoid 1110 has windings provided around it, similar to the solenoids used in the solenoid stations of the first, second and third embodiments. The solenoid station 1100 according to the fourth embodiment requires less power (less current required) to operate than the solenoid stations of the first and second embodiments. In the fourth embodiment, both the magnetic ring 1120 and the solenoid 1110 provide a magnetic field, which is used to repel magnets 800 disposed within wheels 140, 150 that are rotating adjacent to the solenoid station. The solenoid station 1100 may be used instead of the solenoid stations 120, 130 of the first, second and third embodiments, to thereby provide a control device that requires less power to operate.

Also, while the present invention has been described as having four magnets per wheel, other numbers of magnets per wheel may be contemplated while remaining within the scope of the invention, such as having as little as two magnets (and corresponding cylindrical regions) per wheel to as much as 16 magnets per wheel (or perhaps more, depending on the device to be controlled and the degree of preciseness of the control needed). The only requirement is that the computer has to provide the proper control signals to the solenoid stations in order to provide the magnetic pulses at the precise instants in time to magnets disposed within the rotating wheels.

For example, if only back-forth control or propulsion is needed, then only two oppositely-positioned solenoid stations would be required. Also, in that case, wheels having only two magnets (respectively disposed in two cylindrical regions) could be utilized.

Thus, a control device and a propulsion device has been described according to the present invention. Many modifications and variations may be made to the techniques and structures described and illustrated herein without departing from the spirit and scope of the invention. Accordingly, it should be understood that the methods and apparatuses described herein are illustrative only and are not limiting upon the scope of the invention.

What is claimed is:

1. A control device for controlling an object, comprising:
   a frame;
   a shaft mounted to the frame;
   a first wheel that rotates around the shaft in a first direction, the first wheel having at least two openings on an outer peripheral surface thereof;
   a second wheel that rotates around the shaft in a second direction opposite to the first direction, the second wheel having at least two openings on an outer peripheral surface thereof;
   a motor that provides force to cause the first and second wheels to rotate;
   first and second magnets respectively provided in the at least two openings of the first wheel;
   third and fourth magnets respectively provided in the at least two openings of the second wheel; and
   first and second pulsing stations that output pulses having magnetic fields associated therewith,
   wherein the first pulsing station is operative to output a first pulse at a first instant in time that creates a magnetic field at the first pulsing station of a same polarity as a polarity of a nearest surface of the first and third magnets,
   wherein the first instant in time is a time when the first magnet on the first wheel and the third magnet on the second wheel are passing in front of the first pulsing station, and
   wherein a repelling force is provided to thereby urge the first and third magnets inwards within the respective openings of the first and second wheels, to thereby create a weight distribution change in the first and second wheels that is used to provide a force vector that is used to control the object.

2. The control device according to claim 1, wherein the frame has a bottom surface and two vertical surfaces with at least one opening on each of the two vertical surfaces, the control device further comprising:
   at least two nuts for coupling the shaft to the frame when the shaft is fitted within the openings of the frame.

3. The control device according to claim 2, wherein the frame moves in a direction of the second pulsing station as a result of the weight distribution change of the first and second wheels, to thereby providing the force vector to the object to be controlled.

4. The control device according to claim 2, wherein the first pulsing station outputs a second pulse at a second instant in time, which creates a magnetic field at the first pulsing station of the same polarity as the polarity of the nearest surface of the second and fourth magnets.

5. A control device for an object, comprising:
   a frame;
   a shaft mounted on the frame;
   a first wheel that rotates around the shaft in a first direction, the first wheel having at least two openings that extend from an outer peripheral surface of the first wheel inwards;
   a second wheel that rotates around the shaft in a second direction opposite to the first direction, the second wheel having at least two openings that extend to from an outer peripheral surface of the first wheel inwards;
   a motor which provides force to cause the first and second wheels to rotate;
   first and second magnets respectively provided in the at least two openings of the first wheel;
   third and fourth magnets respective provided in the at least two openings of the second wheel; and
   first and second pulsing stations that output pulses having magnetic fields associated therewith,
   wherein the first pulsing station is operative to output a first pulse at a first instant in time that creates a magnetic field at the first pulsing station of a same polarity as a polarity of a nearest surface of the first and third magnets.
   wherein the first instant in time is a time when the first magnet on the first wheel and the third magnet on the second wheel are passing in front of the first pulsing station, and
   wherein a repelling force is provided to thereby urge the first and third magnets inwards within the respective openings of the first and second wheels, to thereby create a weight distribution change in the first and second wheels that is used to provide a force vector that is used to control the object.

6. A control device for controlling an object, comprising:
   a frame having a bottom plate and two vertical plates extending upwards from the bottom plate;
   a shaft that is fitted through holes of the two vertical plates, wherein the shaft is held in place onto the frame as a result;
   a first wheel that rotates around the shaft in a first direction, the first wheel having at least two openings;
   a second wheel that rotates around the shaft in a second direction opposite to the first direction, the second wheel having at least two openings;

means for causing the first and second wheels to rotate;

first and second magnets respectively provided in the at least two openings of the first wheel;

third and fourth magnets respectively provided in the at least two openings of the first wheel; and first and second pulsing stations provided on the bottom plate of the frame and oppositely positioned with respect to each other, wherein the first and second wheels are disposed between the first and second pulsing stations, wherein one of the first and second pulsing stations is operative to output pulses having a magnetic field associated therewith, having a same polarity as a polarity of a surface of the first through fourth magnets facing the first and second pulsing stations, and wherein a repelling force is provided to thereby urge the first through fourth magnets away from the one of the first and second pulsing stations, at different instants in time, to thereby cause a weight distribution change in the first and second wheels that is used to move the frame and thereby create a force vector used to control the object.

* * * * *